Oct. 5, 1954　　　W. R. PETERSON ET AL　　　2,690,833
FEEDING AND PROPORTIONING MECHANISM
Original Filed Aug. 29, 1947　　　　　　　　8 Sheets-Sheet 1
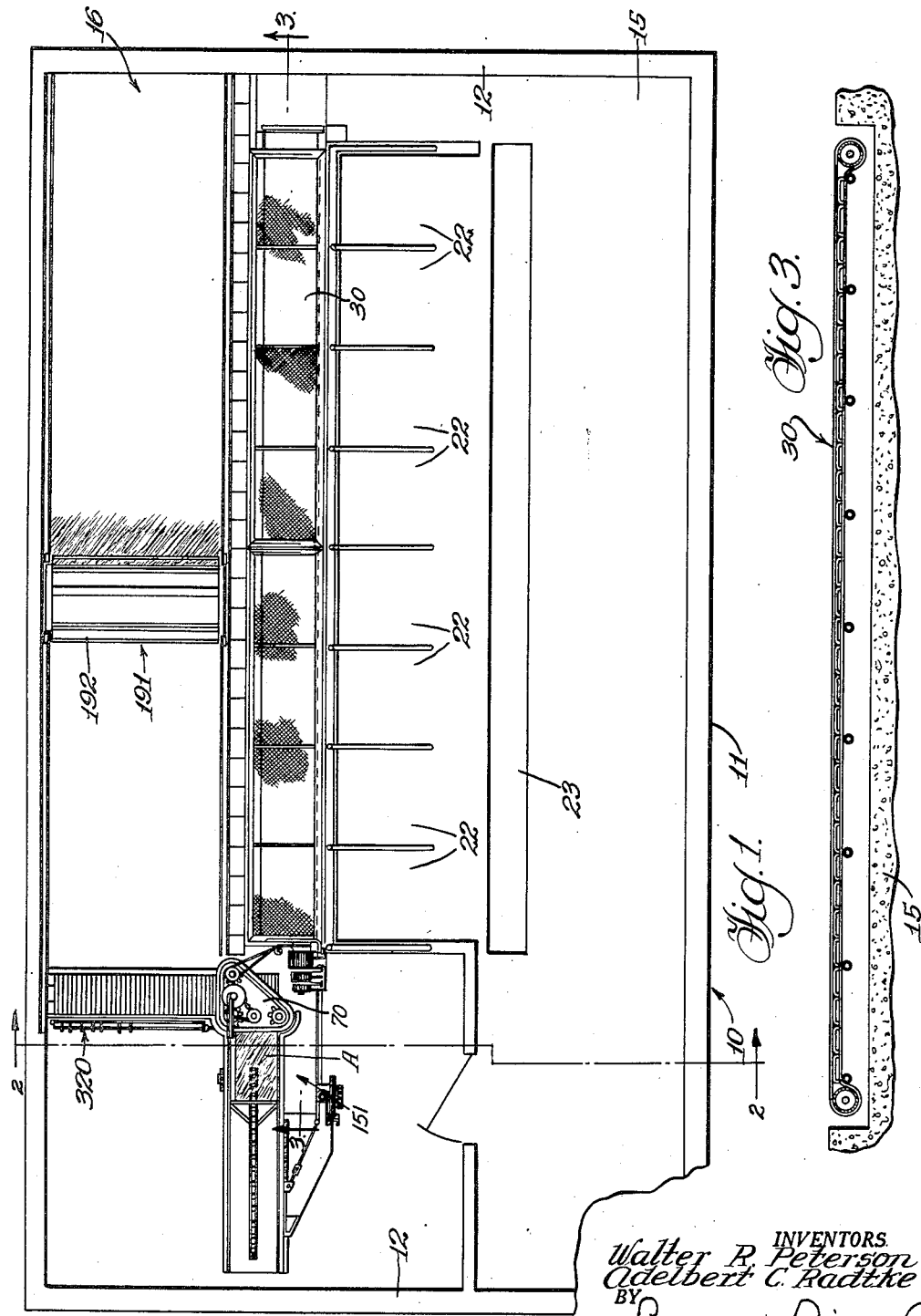
INVENTORS.
Walter R. Peterson
Adelbert C. Radtke
BY
Paul O. Pippel
Atty.

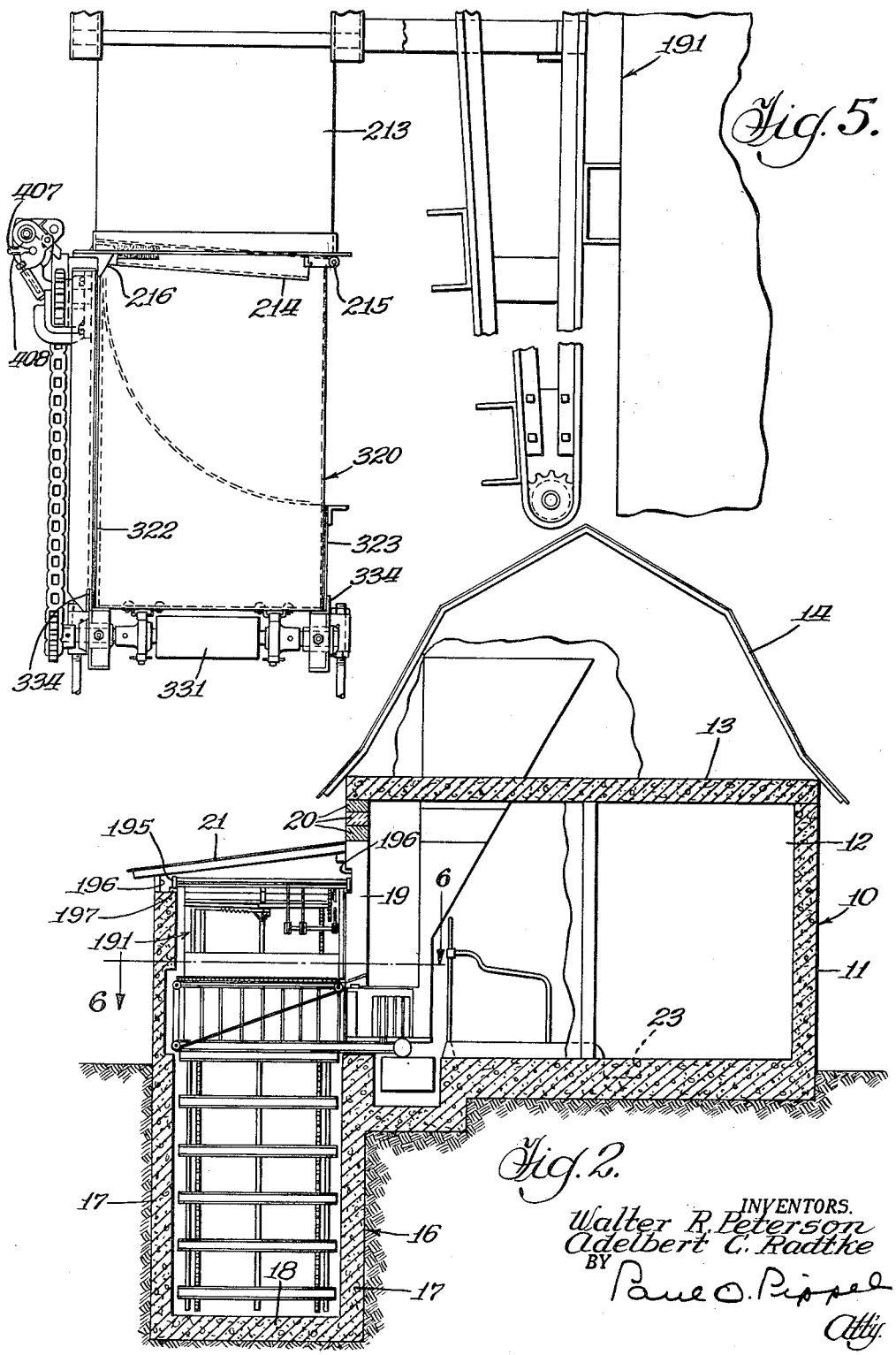

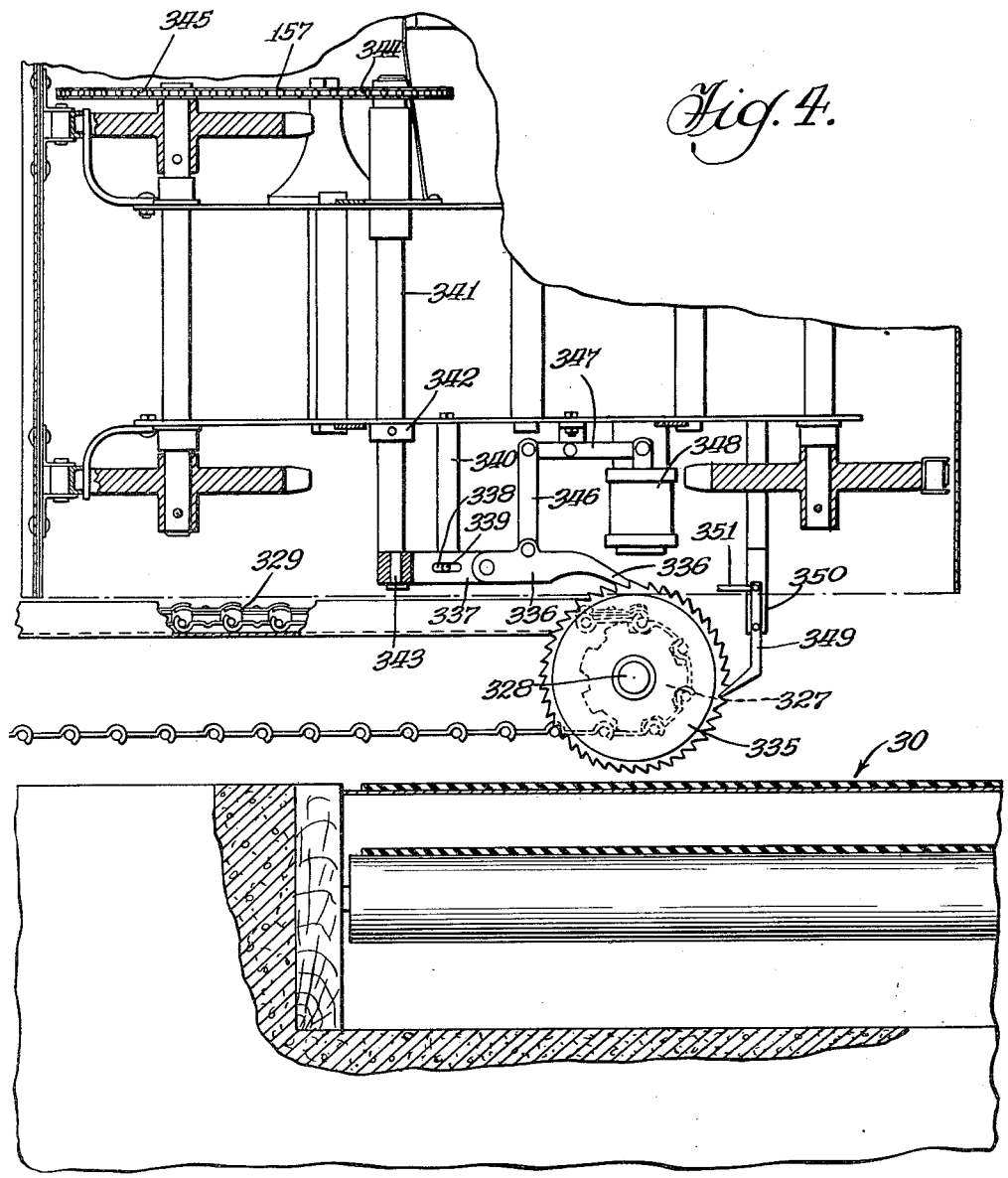

Oct. 5, 1954    W. R. PETERSON ET AL    2,690,833
FEEDING AND PROPORTIONING MECHANISM
Original Filed Aug. 29, 1947    8 Sheets-Sheet 4
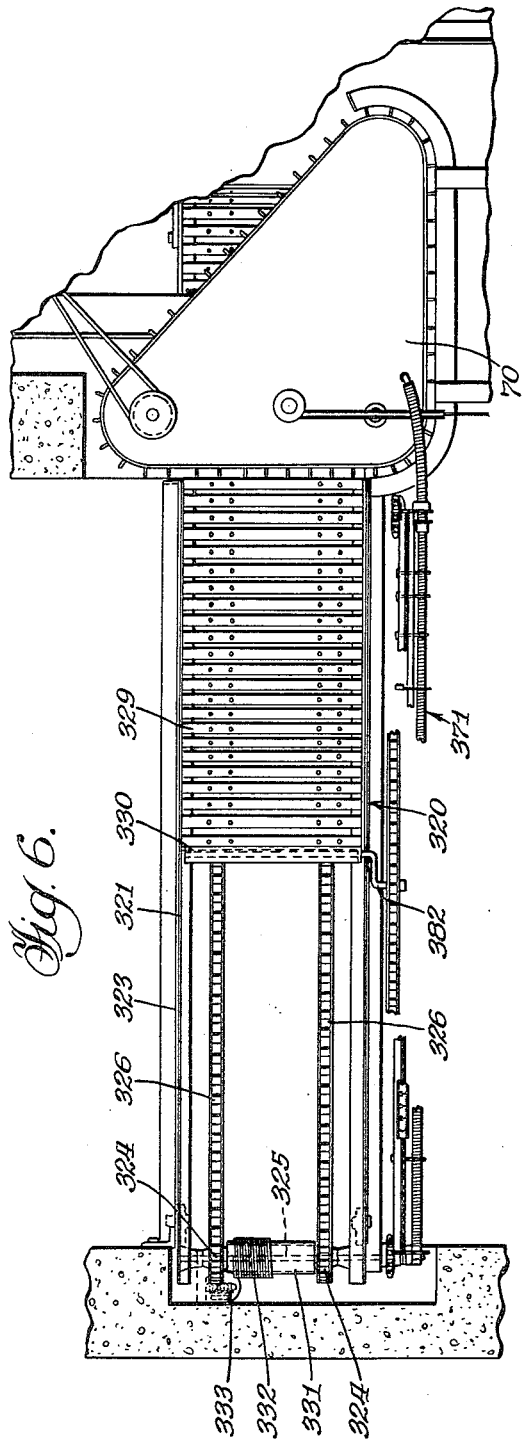
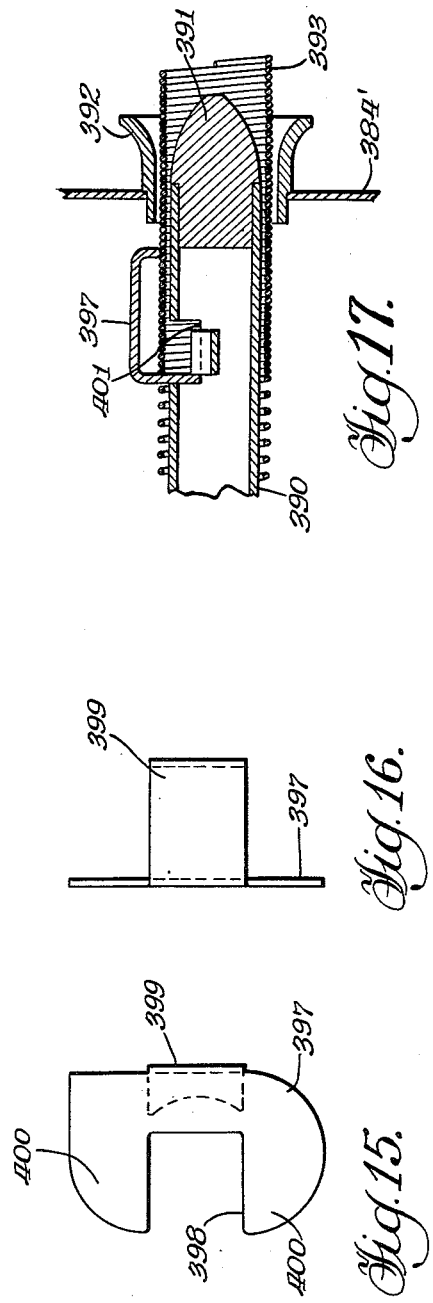
INVENTORS.
Walter R. Peterson
Adelbert C. Radtke
BY
Paul O. Pippel
Atty Oct. 5, 1954   W. R. PETERSON ET AL   2,690,833
FEEDING AND PROPORTIONING MECHANISM
Original Filed Aug. 29, 1947   8 Sheets-Sheet 5

INVENTORS.
Walter R. Peterson
Adelbert C. Radtke
BY Paul O. Pippel
Atty.

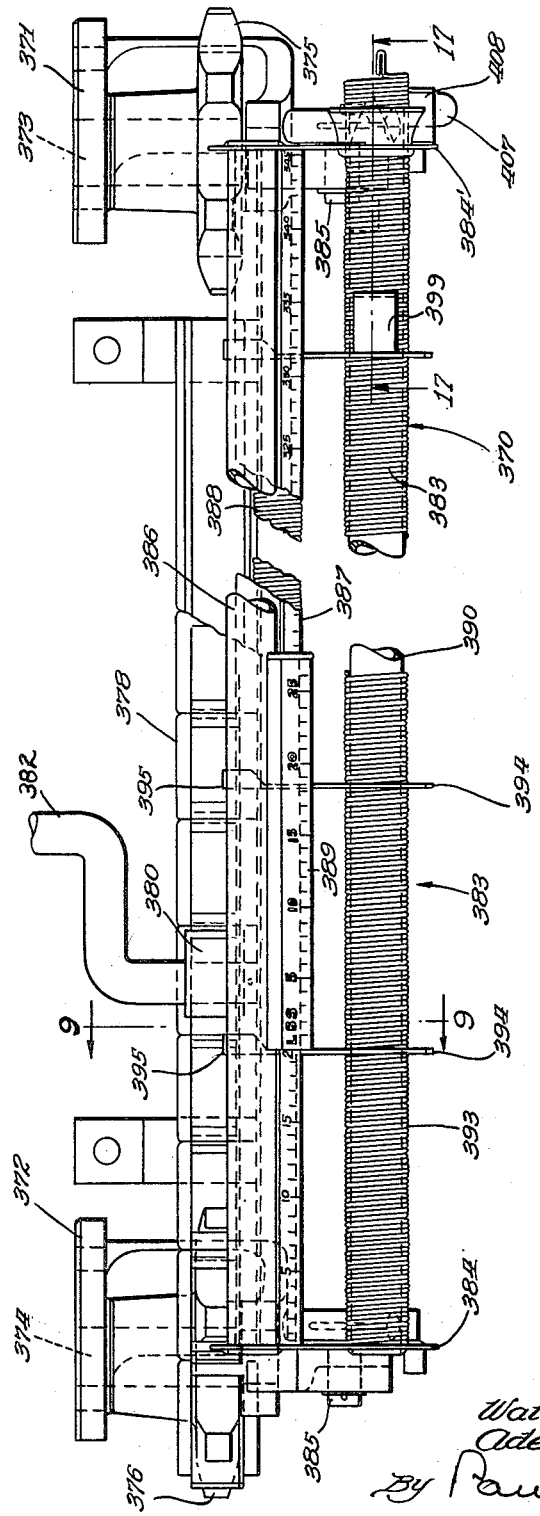

Oct. 5, 1954          W. R. PETERSON ET AL          2,690,833
               FEEDING AND PROPORTIONING MECHANISM
Original Filed Aug. 29, 1947                    8 Sheets-Sheet 7
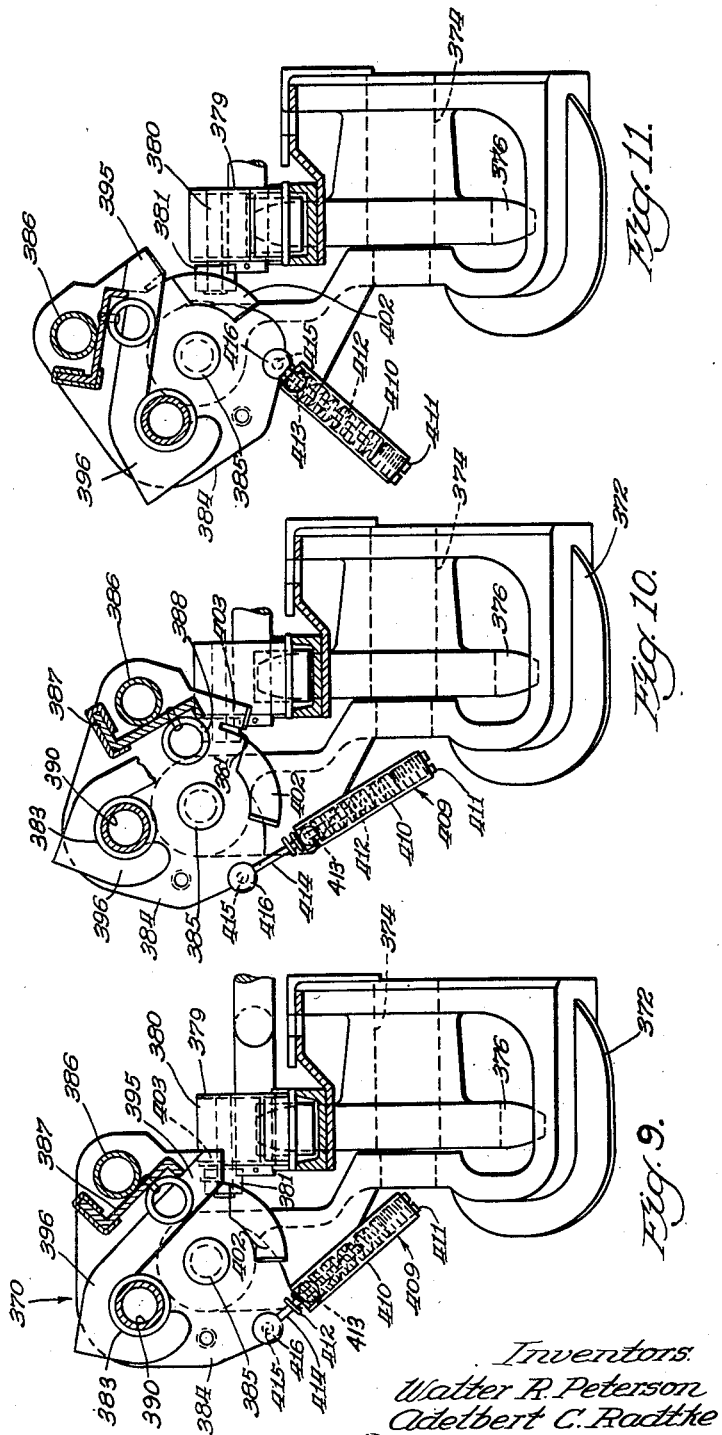
Inventors:
Walter R. Peterson
Adelbert C. Radtke
By Paul O. Pippel
             Atty.

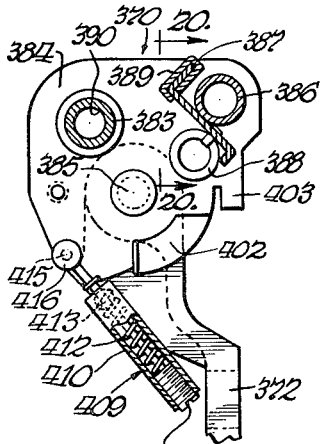
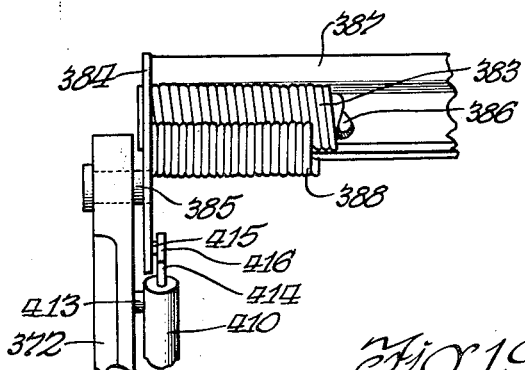
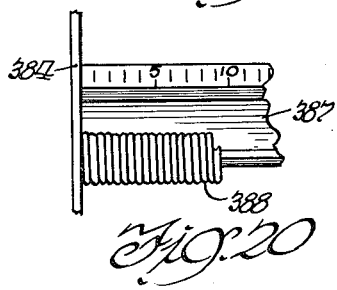
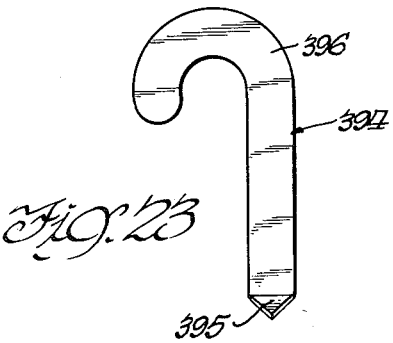
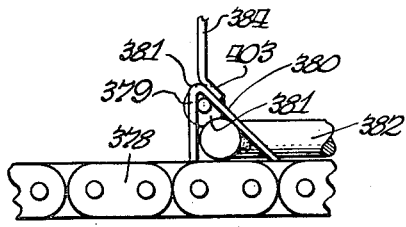
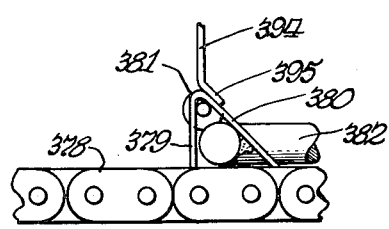
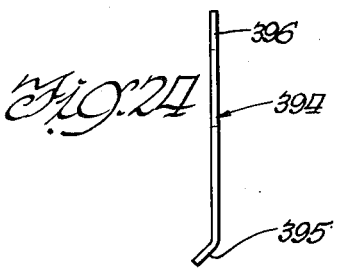

Patented Oct. 5, 1954

2,690,833

UNITED STATES PATENT OFFICE 2,690,833

FEEDING AND PROPORTIONING MECHANISM

Walter R. Peterson, Hinsdale, and Adelbert C. Radtke, Oak Park, Ill., assignors to International Harvester Company, a corporation of New Jersey Original application August 29, 1947, Serial No. 771,250. Divided and this application December 21, 1950, Serial No. 202,072

6 Claims. (Cl. 198—39)

This application is a division of applicants' copending application relating to a Mechanized Feeding Mechanism for Dairy Establishments, Serial No. 771,250, filed August 29, 1947, and now Patent No. 2,654,344.

The invention disclosed in the present application relates to an ensilage feeding and proportioning mechanism and conveyor for conveying feed to a herd of dairy cattle in accurate specific predetermined amounts. The above mentioned application and applicants' copending divisional application Serial No. 202,071, filed December 21, 1950, disclose a mechanism wherein a movable manger belt is arranged to carry feed adjacent the individual stalls in which the animals are situated. Individual mechanized feeding arrangements deliver quantities of feed to the animals in specific amounts. An ensilage removal mechanism is disclosed to remove quantities of the ensilage from a trench silo adjacent the barn establishment. The ensilage after removal from the silo is deposited in a conveyor hopper which will deliver the ensilage to the manger belt. The conveyor hopper is provided with a proportioning mechanism arranged to properly proportion the amounts of ensilage which are carried to the animals.

It is a prime object of this invention therefore to provide a measuring device for accurately feeding ensilage to a moving manger belt.

Still another object is to provide a proportioning mechanism operable to accurately proportion a quantity of ensilage feed to be delivered to each individual cow of a dairy herd.

Still another object is to provide an ensilage feeding conveyor having a proportioning mechanism electrically operable to automatically deliver measured quantities of feed to a movable manger belt.

These and further objects will become more readily apparent from a reading of the description and from an examination of the drawings:

In the drawings:

Fig. 1 is a dairy barn having its roof removed therefrom to show in plan view a mechanized feeding mechanism for supplying feed to the animals situated within the barn, some of the objects within this barn being shown in section to better illustrate the invention.

Fig. 2 is a sectional end view of the barn and feeding mechanism therein taken along the line 2—2 of Fig. 1.

Fig. 3 is a sectional view of a removable manger belt taken along the line 3—3 of Fig. 1, this view showing the relation of the manger belt with respect to the floor of the barn.

Fig. 4 is a sectional view of a drive mechanism for driving an ensilage feeding mechanism.

Fig. 5 is a side elevational view of an ensilage elevator showing its relation to a quantity of ensilage packed within a trench silo.

Fig. 6 is a plan view in partial section showing an ensilage feeding mechanism, said view being taken along the line 6—6 of Fig. 2.

Fig. 8 is an enlarged plan view of a proportioning mechanism associated with an ensilage conveyor.

Fig. 9 is a sectional view taken along the line 9—9 of Fig. 8, said view showing an "off" position of a proportioning mechanism.

Fig. 10 is a similar sectional view of the proportioning mechanism, said view showing an "on" position of said device.

Fig. 11 is a view similar to Figs. 9 and 10 of the proportioning mechanism, said view showing an "off" position with an over-center lock position of said device.

Fig. 12 is a detail view showing the "off" position of a mercury switch, said position being indicative of the position of the switch during the position of the proportioning mechanism shown in Fig. 9.

Fig. 13 is a detail view of a mercury switch, said switch being shown in the "on" position, said position being indicative of its position when the proportioning mechanism is in the position shown in Fig. 10.

Fig. 14 is a portion showing the mercury switch in an "off" position, said position being indicative of the position of said switch when the proportioning mechansm is in the over-center position shown in Fig. 11.

Fig. 15 is a detail view of a spring holding clip utilized with the proportioning mechanism.

Fig. 16 is an end elevational view of the same.

Fig. 17 is a sectional view of a portion of the proportioning mechanism taken along the line 17—17 of Fig. 8.

Fig. 18 is a detail sectional view of a portion of a proportioning mechanism as shown in Figures 9 through 11 with certain parts removed.

Fig. 19 is a end-elevational view of a fragmentary portion of a proportioning mechanism shown in Fig. 18.

Fig. 20 is a sectional view taken along the line 20—20 of Fig. 18.

Fig. 21 is a detail view of a cam arrangement for operating a proportioning mechanism.

Fig. 22 is a detail view, similar to Fig. 21, of a cam in operative engagement with an indexing element of a proportioning mechanism.

Fig. 23 is a detail view of an indexing clip.

Fig. 24 is a side-elevational view of the indexing clip shown in Fig. 23.

Figure 7:
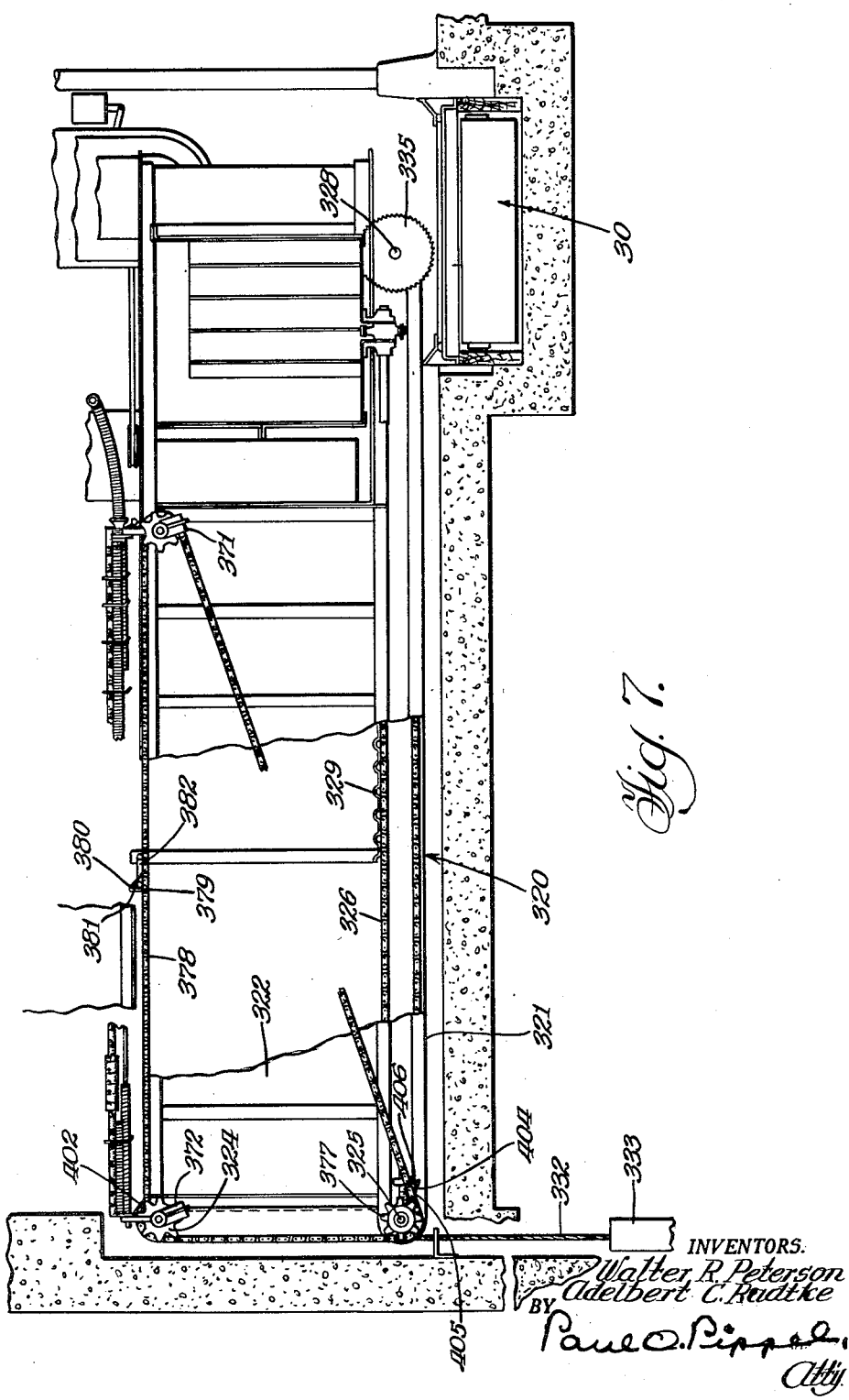
Fig. 7 is a side elevational view of the same ensilage feeding mechanism.

The dairy establishment with which the present invention is concerned includes a barn structure generally indicated by the reference character 10 as best shown in Figs. 1 and 2. This type of barn structure is constructed to house a mechanized feeding unit for supplying feed to the dairy animals and consists generally of side walls 11, end walls 12, and an upper supporting floor 13 on which a roof 14 is supported. The construction generally is of concrete, thereby providing a solid fire-proof building. The lower floor is indicated by number 15. Immediately adjacent one side of the barn structure 10 a trench silo 16 is provided. The trench silo is constructed of vertical concrete walls 17 extending a considerable distance into the ground, where they are joined by a floor or bottom 18. A common vertical wall 19 serves as a wall for the trench silo and also for the barn. The silo therefore affords protection against weather thus protecting the common wall. The area adjacent this common wall, within the barn, is thus kept relatively warm during cold weather.

In order to properly permit light to enter the interior of the barn 10, a few courses of glass blocks 20 are laid between the wall 19 and the upper floor 13. An overlapping sectional metal roof 21 is placed over the trench silo, these roof sections being readily opened or removed if desired to supply ensilage to the silo.

As best shown in Figures 1 and 2, the barn 10 is provided with eight animal stalls 22. These stalls 22 are arranged near the warm side of the barn, adjacent the common wall 19. A gutter 23 is formed in the concrete floor 15 of the barn. An endless movable manger belt mechanism 30 is provided, the mechanism being described in detail in the parent application.

An ensilage removal mechanism is generally designated by the reference character 191. The mechanism 191 is described in applicants' co-pending divisional application, above mentioned, and for the purpose of this application will only be generally described. Ensilage which is removed by the mechanism 191 is deposited in a hopper 213 which is moved over an ensilage feeding mechanism generally indicated at 320.

*The ensilage feeding mechanism*

The ensilage feeding mechanism is best shown in Figures 1, 2, 4, 5, 6 and 7 and is indicated by the reference character 320. The manger belt described in the parent application is designed to move adjacent the stalls. Feed is deposited on the belt at various points and the feed is moved to a point in front of each stall wherein each cow has access to the feed intended to each particular animal which feed it can then consume. The ensilage feeding mechanism is intended to convey ensilage feed in measured quantities to the moving manger belt, the feed being deposited on the belt at various positions as the belt is moving. Thus this ensilage is deposited in accordance with the requirement of each animal, the manger belt being coordinated to move each quantity of ensilage to the particular animal where it is consumed. The animals consume the feed from the manger belt. The control mechanism of the parent application intermittently actuates the ensilage feeding mechanism, so that the requirements of one cow are placed on the manger belt, the manger belt advances, the ensilage feeding mechanism deposits feed for the next cow, the belt advances and so on, until ensilage is placed at spaced points on the belt until all requirements are met.

The ensilage feeding mechanism 320 consists generally of a conveyor hopper 321. The conveyor hopper 321 is provided with a relatively high side wall 322 and a relatively low side wall 323 as shown in Figure 7. A pair of sprockets 324 are pivoted at the rear end of the conveyor 321 on a shaft 325 supported at the rear of said conveyor. A pair of endless chains 326 are engaged with sprockets 324 and extend forwardly with respect thereto. At the forward portion of the conveyor there are provided a pair of sprockets 327, only one of which is shown in Figure 4. The sprocket 327 is fixed to a shaft 328, said shaft being carried at the forward portion of the conveyor structure. An apron 329, as best shown in Figures 4 and 6, is connected to the endless chains 326 for movement therewith. A vertical plate member 330 is rigidly secured to the rear end of the apron 329 for movement therewith.

A roller 331 is fixed to the shaft 325 at the rear of the conveyor. A cable chain or rope 332 is connected to the roller and is adapted to be wound thereon. A weight 333, as best shown in Figure 7, is connected to the end of the cable 332. The weight 333 urges the roller 331 in a counter-clockwise direction thereby normally urging the chain 326 and the apron 329 rearwardly toward the end of the conveyor.

A ratchet wheel 335, best shown in Figures 4 and 7, is connected to the shaft 328 for driving engagement therewith. The ratchet wheel 335 is driven by means of a pawl 336. The pawl 336 is pivotally connected to a push-pull member 337. The push-pull member 337 is provided with a slot 338 which has sliding connection with a pin 339 secured to a bracket 340. A shaft 341 extends vertically through the plate members 71 and is journaled in bearing members 342. The shaft 341 is provided at its lower end with an eccentrically positioned pin 343. The eccentrically positioned pin 343 extends through the end of the push-pull member 337. A sprocket 344 is connected to the uppermost end of the shaft 341 for driving engagement therewith. The sprocket 344 is driven by means of the chain which is trained about an idler sprocket 345 immediately adjacent the sprocket 344. The chain is driven from the mechanism of a shredder unit 70 which is more fully described in the above mentioned parent application. As the sprocket 344 is rotated, the push-pull arm 337 reciprocates, thus moving the pawl 336 into engagement with the ratchet 335, thereby driving the arm.

The pawl is pivotally connected to a link 346 which in turn is pivotally connected to a horizontal arm 347. The horizontal arm 347 is pivotally connected to the underneath side of a plate member 71 and is connected thereto and to a solenoid 348. By energizing the solenoid, the pawl 336 can be moved into engagement with the ratchet 335. The weights 333 normally tend to pull the apron and chain rearwardly toward the rear of the conveyor, thereby urging the ratchet 335 normally in a counterclockwise direction. A holding pawl is provided to restrain the movement of this ratchet during operation. The holding pawl 349 is pivotally connected to a bracket 350 and is actuated mechanically through link 351.

The ensilage proportioning mechanism

The ensilage proportioning mechanism is best shown in Figures 1, 2, 5, 7, 8, 9, 10, and 11 and is designated by the reference character 370. The ensilage is removed from the silo by means of the elevator 191. It is thereupon lifted into the hopper 213. The ensilage removal mechanism thereupon travels rearwardly toward the ensilage feeding mechanism, whereupon the ensilage is subsequently dumped into the conveyor hopper 321. Movement of the apron 329 causes the ensilage to be conveyed toward the shredder unit 70, whereupon the ensilage is shredded onto the movable manger belt 30. It is desired that specific predetermined quantities of ensilage be placed on the belt at specific points so that the required individual ensilage requirements of each cow are provided for. The novel proportioning mechanism 370 is provided for this purpose.

The ensilage proportioning mechanism 370 is connected to brackets 371 and 372. The bracket 371 is provided with a shaft 373 and the bracket 372 is provided with a shaft 374. The shaft 373 carries a sprocket 375 and the shaft 374 carries a sprocket 376 as best shown in Figure 8. A third sprocket 377, as shown in Figure 7, is fixedly connected to the shaft 325. The sprockets 375 and 376 are freely journaled on their respective shafts. An endless chain 378 is constrained around the sprockets 375, 376 and 377. As best shown in Figures 7, 9, and 11, a triangularly shaped cam 379 is connected to the chain 378. The cam 379 is provided with an angled surface 380. A roller 381 is journaled on one side of the cam. An S-shaped rod 382 is connected at one end to the plate member 330 and at its other end to the cam 380. Movement of the apron 329 is imparted to the chain 378 by means of this connection.

A tiltable proportioning bar is generally referred to by the reference character 383 and extends substantially the length of the conveyor 321. The proportioning bar 383 comprises a pair of longitudinally spaced end plate members 384 and 384' which are pivotally connected by means of pins 385 to the brackets 371 and 372. As best shown in Figures 9, 10 and 11, a torsion tubular supporting member 386 extends longitudinally and is connected at each end to the plate members 384 and 384' which rigidly secures the structure together. An S-shaped indicating scale or bar 387 is also connected at each end to the plate members 384 and 384'. The S-shaped scale beam 387 has connected thereto an extension spring 388 extending the full length of the bar 387. As best shown in Figure 8, the indicating bar 387 includes indices from zero to 345, the figures indicating pounds of ensilage. A movable scale member 389 is slidably connected to the bar 387. The scale member 389 also has indices from zero to 25 indicating pounds of ensilage.

As best shown in Figures 8 and 9, a tube 390 is connected to plate member 384. As best shown in Figure 17 the tube 390 extends forwardly and is provided at its end with a pointed end 391. The pointed end 391 extends through a guide member 392 which is secured to the plate member 384'. A spring 393 encircles the tube 390 and is connected at one end to the bracket 384. The spring includes an unconnected end which extends through the guide member 392.

As best shown in Figures 8 and 9, a plurality of indexing elements or hook shaped clips 394 are supported on the spring 393. Each indexing element 394 is provided with a bent end or tab 395 best shown in Figures 8 and 11. Each indexing element 394 is also provided with a hook section 396 which is adapted to be clamped between the coils of the spring 393.

As best shown in Figures 8, 15 and 17, a stop clip 397 is provided near the end of the spring 393. The stop clip 397 is provided with a slot 398. The clip further has a longitudinal portion 399 having a pair of downwardly projecting ears 400. The downwardly projecting ears 400 are finger tabs and are adapted to engage a coil of spring 393 eventually engaging a recess 401 cut into one end of the tube 393.

Referring to Figures 9, 10 and 11, it will be noted that the plate member 384 is provided with an inwardly bent arcuate tab 402. The arcuate tab 402 provides a top camming surface which may be engaged by the roller 381 of the cam 378. As best shown in Figure 10, the plate member 384 is also provided with an inwardly bent clip or tab 403 which extends inwardly with respect to the plate member and is adapted to provide an under camming surrface.

As best shown in Figure 7, the chain 378 is also provided with a triangularly shaped cam member 404. The cam member 404 includes an angled surface 405. A roller 406 is journaled on one side of the cam 404 to engage under camming surface of arcuate tab 402.

As shown in Figures 8, 12, 13 and 14, a mercury tube switch 407 is connected to the bracket 384' and is adapted to move or tilt therewith. The tube 407 is supported by means of a clip 408.

An over-center linkage mechanism is indicated at 409. The mechanism 409 consists of a tubular element 410 having an adjustable set screw 411 at its lower end. A spring 412 is positioned within the tubular member which is pivotally connected to a portion of the bracket 372. An arm 414 is pivotally connected to a portion of the bracket 384 as indicated at 415. The tubular element 410 is pivotally connected to a stub shaft 413 supported on the bracket 372. The arm 414 extends inwardly into the spring 412 and tubular member 410. The spring 412 is adapted to abut a spherical member 416 when the mechanism is in the over-center position as indicated in Figure 11.

The operation

Assuming that the hopper 213 of the ensilage removal mechanism 191 has been moved to the position indicated in Figure 5, and the ensilage has been discharged to the ensilage feeding mechanism 320, it is now necessary to set the proportioning mechanism 370 to feed the ensilage to the shredder mechanism 71 whereupon it is subsequently delivered to the movable manger belt 30.

In an accurate feeding operation, the farmer generally has a scientific statistical record of the quantity of ensilage that is needed by each individual cow. He therefore consults his chart to determine what each individual requirement is. Referring particularly to Figure 8, it will be noted that the scale beam 387 of the proportioning mechanism is provided with indices as well as the movable scale 389. The farmer thereupon moves the movable scale 389 to the extreme left end or zero position indicated by the calibrations. Assuming that the first cow requires ten pounds of ensilage, the farmer thereupon places one of the clips or indexing elements 394 onto the spring 383 opposite the number 10 on the movable scale 389. He thereupon moves the movable scale 389 with its zero calibration opposite the indexing element 394 which has just been placed in position. He then determines what the next cow's ensilage requirement is and places a second indexing element opposite the number of pounds required as indicated on the movable scale 389. Since the total maximum poundage per feeding per animal requirements of ensilage seldom exceed twenty-five pounds, the calibrations or indices on the movable scale do not exceed the figure 25. The farmer, by moving the movable scale 389, can very quickly locate the clips or indexing elements at the exact positions on the spring opposite the indices on the scale beam. By utilizing the movable scale 389 the farmer need not add up the previous totals on the indicating bar 387 in order to determine where his next indexing clip is to be placed. He merely moves the scale 389 and positions his clips according to the indices on the movable scale. When the last indexing element 397 has been placed for proportioning the amount for the eigth cow, the farmer reads the total requirements on the face of the indicating bar 387 and he thus quickly can determine what the exact total poundage adds up to.

As indicated, the farmer has hooked the indexing elements 394 onto the coils of the spring 383. The position of each indexing element is opposite an indice indicating pounds of ensilage. Each indexing element is thus positioned representing one cow. The last indexing element, as best shown in Figures 8, 15 and 16, is different from the elements 394 and is considered a stop clip 397. The stop clip 397 is so shaped that it engages a recess 401 cut in the pipe 390 as best shown in Figure 17.

After the seven indexing elements 394 have been placed in spaced relation on the spring 383 the stop clip 397 is placed in position. The position of this clip is opposite the indices on the scale bar 387, which indicates the total amount of ensilage needed. After the indexing elements are thus placed on the spring 383 the farmer then engages stop clip 397 between the coils of the springs 383. He thereupon presses his fingers against the wings 400 of the stop clip 397 and moves the stop clip to the far right end of the proportioning mechanism 370. By so doing this he thus extends spring 383. The stop clip 397 is now immediately above the slot 401 in the tube 390. He thereupon presses downwardly on the stop clip 397, thereby locking the spring 390 in its extended position. Since the proportioning mechanism 370 extends substantially the length of the conveyor hopper 321, the stop clip 397 and the indexing elements 394 are now also spaced substantially parallel the entire length of the hopper. It can readily be seen now that each indexing element 394 has moved a proportionate distance with respect to the other elements. In other words, each indexing element has moved a proportionate distance apart with respect to the other indexing elements and thereby proportionate positioning of the indexing elements is effected. At this point, the indexing elements are still suspended upon the coils of the spring 383. It is now desired, however, to lock these elements securely in place in their respective positions. The operator thereupon presses the indexing elements 394 between the coils of the spring 383 at their new indexing positions. The lower ends of the indexing elements are rotated to an engaging position between the coils of the spring 383, said elements resting against the lower edge of the scale bar 387 as best shown in Figure 9. Since the indexing elements 394 are now held between coils of the springs 383 and 390, they are sufficiently supported to act as camming members as will presently be fully described. Since the amount of ensilage placed within the ensilage feeding hopper may vary from day to day, and since the amount of ensilage fed to the hopper is evenly spread over its entire length, it is necessary that this type of proportioning mechanism be utilized. By the arrangement indicated, applicants have found a novel and practical way of proportioning the amount of ensilage which is fed to the shredder unit so that each cow may receive its proportionate share of the total which is dumped into the hopper.

The effect of the weight 333 upon the endless chains 326 has been previously described. At the beginning of the cycle of the proportioning mechanism the vertical plate 330 and the rear end of the apron 329 are resting at the extreme rearmost end of the conveyor hopper 321. When the vertical plate 330 is in this position, the flat surface 389 of cam 379 engages the under surface of the inwardly bent clip portion 403 of the end plate member 384. The ensilage proportioning mechanism 370 is thus held in the position shown in Figure 9, the cam 380 serving to prevent rotation of said mechanism in a clockwise direction about the pivot pin 385. In this position the mercury switch 407, which is connected to one end of the proportioning mechanism, is in the "off" position as shown in Figure 12.

As indicated in the description, the sprocket 344 is driven from the shredder unit 70. When the solenoid 348 is actuated the pawl 336 engages the ratchet wheel 335 and movement of the apron 329 is begun toward the shredder mechanism. This energization of the solenoid is accomplished from a control mechanism which is well illustrated in the above mentioned parent application and need not be further described here. Initial energization of the solenoid 348 is accomplished by the closing of a contact switch described in the parent application. Momentary contact causes operation of the solenoid 348 so that the conveyor 329 begins forward movement. Upon energizing of the solenoid 348, the apron 329 moves forwardly. This forward movement causes the chain 378, best shown in Fig. 7, to also move by virtue of its connection to the shaft 325. As the chain 378 moves forwardly, the cam 379 is moved from underneath the tab 403 and the ensilage proportioning mechanism 370 thereupon pivots about the pins 385 in a clockwise direction. In other words, the proportioning mechanism drops by virtue of its own weight to a position indicated in Figure 10. As shown by the position of the switch 407 in Figure 13, the switch is now in an "on" position. Thus after initial energization of the solenoid from the contact switch disclosed in the parent application, continued energization is accomplished through the closed switch 407. The switch 407 as previously described is in series with the solenoid 348 energizing the solenoid 348 to permit driving movement of the pawl 336, for continuing forward movement of the apron 329. The forward movement of the apron causes the ensilage within the hopper 321 to be pushed against the shredder mechanism 70. Since the shredder mechanism is rotating, the scraper blades of the shredder scrape quantities of ensilage from the silage conveyed in hopper 320 to deposit the same upon the movable manger. The ensilage is picked up between the scraper blades which carry the ensilage by the forward end of the foremost bale of hay on the hay feeding mechanism 151, whereupon it is subsequently dropped to the manger belt. The cam 380 thereupon moves forward until it reaches the first indexing element 394. As it reaches the first indexing element 394 the cam 390 engages the bent end or tab 395 of the first indexing element. As this cam-like face of the clip is engaged the proportioning mechanism 370 is tilted upward in a counter-clockwise manner about the pivot pins 385 thereupon causing the mercury within the switch 407 to again take the position as shown in Figure 12 and thereby opening up the circuit leading to the solenoid 348. Sufficient ensilage has now been deposited on the manger belt 30 to supply the feeding needs of the first cow.

As mentioned above, the parent application contains a control mechanism. In response to the operation of this mechanism, the solenoid 348 is again actuated to again start the apron moving for supplying a predetermined quantity of ensilage for the next cow to be fed. In other words, the indexing elements are engaged by the cam 379 to tilt the proportioning bar for opening the switch 407. However, the control mechanism of the parent application again actuates the solenoid to continue movement of the chain to again open the switch 407. The momentary lapse of movement of the endless chain permits the manger belt to move into position for receiving the next cow's requirements. The cam 379 thereupon passes from under the first clip and the proportioning mechanism 370 again falls clockwise into the "on" position shown in Figure 13. The cycle of operation is repeated upon successive engagement of the cam 390 with the hook-shaped cams or indexing elements 394. Each clip represents a cow to be fed and sufficient ensilage is placed upon the moving manger belt to take care of the requirements of each cow. When the cam 389 reaches the foremost portion of the proportioning mechanism the cam 404 has reached a position whereupon the roller 406 engages the underneath side of the inwardly bent arcuate tab 402 on the end plate member 384, thereby tilting the proportioning mechanism 370 to an over center locked position indicated in Figure 11.

In the position indicated in Figure 11, the proportioning mechanism has been tilted in a counter-clockwise direction to its maximum position and the mercury within the switch 407 is shown in the "off" position as indicated in Figure 14. In this position it will be noted that the over-center holding mechanism 409 is in a locked position, the pivotal point 415 having been moved past the pivot 413 and the pivot pin 385 thereby effecting an over-center locking relation. The proportioning mechanism 370 is therefore now locked in this extreme counter-clockwise position. The apron at this point has advanced to its maximum forward and stopped position. The operator thereupon manually releases the holding pawl 349, thereby disengaging the same from the sprocket 327. The weight 333 is now sufficient to pull the apron 329 back to its rearmost position. As soon as the apron is pulled back to this position, movement of the chain 376 is also reversed. The cam 380 is pulled rearwardly and the roller 331 engages the upper surface of the inwardly bent arcuate tab 402, thereby actuating the proportioning mechanism 370 to pivot in a clockwise direction and release the same from the locked position shown in Figure 11. The clockwise movement of the proportioning mechanism 370 is, however, limited since the angled surface 379 of the cam 380 engages the underside surface of the inwardly bent clip or tab 403 thereupon preventing movement of the proportioning mechanism to an "on" position. The cycle of operation for the ensilage feeding mechanism can now be repeated.

It can now be seen that a novel ensilage feeding and proportioning mechanism has been provided.

What is claimed is:

1. A horizontal conveyor for carrying a predetermined weight of material evenly spread, an indicating member for the conveyor, equally spaced consecutively numbered indices on said member, said indices being no greater in number than the maximum weight of material to be received by said conveyor, an expansible proportioning means substantially parallel to the indicating member, indexing elements engageable with said expansible means at any location on the length thereof, said indexing elements being placed on said expansible means in spaced relation thereby indicating proportionate amounts of material to be delivered by the conveyor, means constructed and arranged to support said expansible means in an expanded position whereby the last indexing element is moved the full length of the conveyor, power means connected to said conveyor for moving the same, and control means connected to said power means and engaged by said indexing elements to stop movement of said conveyor.

2. A horizontal conveyor for transporting a predetermined weight of material evenly spread over the conveyor, an indicating member extending the entire length of the conveyor, equally spaced consecutively numbered indices on said member, said indices being no greater in number than the maximum weight of material to be received by said conveyor, an expansible proportioning means extending the entire length of said member, indexing elements engageable with said expansible means at any location on the length thereof, said indexing elements being placed on said expansible means in spaced relation thereby indicating proportionate amounts of material to be delivered by the conveyor, means constructed and arranged to support said expansible means in an expanded position whereby the last indexing element is moved the full length of the conveyor, power means connected to said conveyor for moving said conveyor, and control means connected to said power means and engaged by said indexing elements to stop movement of said conveyor.

3. A horizontal conveyor for conveying a predetermined weight of material evenly spread, an indicating member for said conveyor, numbered indices on said member, said indices being at least equal in number to the maximum weight of material to be received by said conveyor, an expansible proportioning means extending substantially the length of said scale, indexing elements engageable with said expansible means at any location on the length thereof, said indexing elements being placed on said expansible means in spaced relation thereby indicating proportionate amounts of material to be delivered by the conveyor, means constructed and arranged to support said expansible means in an expanded position whereby the spacing of the indexing elements is proportionally increased, the last indexing element being arranged opposite the indice indicating the total weight of the conveyor, power means connected to said conveyor for moving the same, and control means connected to said power means and engageable by said indexing elements to stop movement of said conveyor.

4. A horizontal conveyor for conveying a predetermined weight of material evenly spread, an indicating member on the conveyor, equally spaced consecutively numbered indices on said member, said indices being substantially equal in number to the maximum weight of material to be received by said conveyor, an expansible proportioning means extending substantially the length of said member, indexing elements engageable with said expansible means at any location on the length thereof, said indexing elements being placed on said expansible means in spaced relation thereby indicating proportionate amounts of material to be delivered by the conveyor, means constructed and arranged to support said expansible means in an expanded position whereby the last indexing element is moved the full length of the conveyor, power means connected to said conveyor for moving the same, and control means connected to said power means and engageable by said indexing elements to stop movement of said conveyor.

5. A mechanized feeding conveyor for conveying feed to a plurality of animal stalls comprising a horizontal conveyor arranged to receive a predetermined quantity of feed evenly spread thereon, said quantity being arranged to equal the total feeding requirements of all the animals within the stalls to be fed, means for conveying said total quantity of feed to the animals in individual portions, said means including a driving mechanism connected to the conveyor, a proportioning mechanism for said conveyor, an indicating means on said proportioning mechanism, said indicating means having indices thereon indicating the total weight of feed adapted to be moved by said conveyor, an expansible element extending substantially parallel to said indicating means, a plurality of movable indexing elements, each indexing element being supported on said resilient element in longitudinal spaced relation, means constructed and arranged to support said expansible element in an expanded position, whereby each indexing element is moved a proportionate amount with respect to the other, power means connected to said driving mechanism for moving said driving mechanism and said conveyor, and control means connected to said driving mechanism and engaged by the indexing elements to control said driving mechanism and to regulate movement of said conveyor.

6. A conveyor for conveying variable amounts of material evenly spread thereon, the combination therewith of a proportioning mechanism for said conveyor, said proportioning mechanism comprising an indicating member having indices thereon, said indices indicating the lowest and highest weights of the material conveyed by said conveyor, an expansible element extending substantially the length of said indicating member, indexing elements movable to any position on said expansible element, said indexing elements being placed on said expansible means in spaced relation thereby indicating proportionate amounts of material to be delivered by the conveyor, supporting means for supporting the expansible means in an expanded position whereby the indexing elements are proportionally advanced, the last indexing element being positioned substantially near the end of the indicating member, driving means connected to said conveyor for moving said conveyor, and control means connected to said conveyor and engaged by said indexing elements to control movement of said conveyor.

References Cited in the file of this patent

UNITED STATES PATENTS

| Number | Name | Date |
| --- | --- | --- |
| 1,727,353 | Merrick | Sept. 10, 1929 |
| 2,128,252 | Johnson | Aug. 30, 1938 |
| 2,276,383 | Francis | Mar. 17, 1942 |
| 2,302,314 | Haggart | Nov. 17, 1942 |
| 2,310,592 | Noble | Feb. 9, 1943 |
| 2,358,000 | Cornell | Sept. 12, 1944 |
| 2,381,505 | Lindholm | Aug. 7, 1945 |
| 2,410,873 | Gayring | Nov. 12, 1946 |